United States Patent
Cho et al.

(10) Patent No.: US 8,148,897 B2
(45) Date of Patent: Apr. 3, 2012

(54) BACKLIGHT UNIT FOR LCD USING LED

(75) Inventors: Jae-hee Cho, Yongin-si (KR); Hyung-kun Kim, Suwon-si (KR); Cheol-soo Sone, Anyang-si (KR)

(73) Assignee: Samsung Electro-Mechanics Co., Ltd., Suwon-Si, Gyeonggi-Do (KR)

( * ) Notice: Subject to any disclaimer, the term of this patent is extended or adjusted under 35 U.S.C. 154(b) by 1198 days.

(21) Appl. No.: 11/411,094

(22) Filed: Apr. 26, 2006

(65) Prior Publication Data

US 2006/0244712 A1 Nov. 2, 2006

(30) Foreign Application Priority Data

Apr. 27, 2005 (KR) .................. 10-2005-0034919
Mar. 23, 2006 (KR) .................. 10-2006-0026476

(51) Int. Cl.
H05B 33/04 (2006.01)

(52) U.S. Cl. .................................. 313/512; 257/99
(58) Field of Classification Search .............. None
See application file for complete search history.

(56) References Cited

U.S. PATENT DOCUMENTS

| | | | |
|---|---|---|---|
| 6,483,196 B1 * | 11/2002 | Wojnarowski et al. | 257/778 |
| 7,111,964 B2 * | 9/2006 | Suehiro et al. | 362/328 |
| 7,270,461 B2 | 9/2007 | Chou | |
| 7,352,011 B2 * | 4/2008 | Smits et al. | 257/99 |
| 7,427,366 B2 * | 9/2008 | Tian et al. | 252/301.4 S |
| 7,670,503 B2 * | 3/2010 | Miyachi | 252/299.01 |
| 2002/0140880 A1 * | 10/2002 | Weindorf et al. | 349/70 |
| 2004/0056256 A1 | 3/2004 | Bokor et al. | |
| 2004/0061810 A1 * | 4/2004 | Lowery et al. | 349/62 |
| 2005/0199884 A1 * | 9/2005 | Lee et al. | 257/79 |
| 2006/0102914 A1 * | 5/2006 | Smits et al. | 257/98 |

FOREIGN PATENT DOCUMENTS

| | | |
|---|---|---|
| CN | 1373523 | 10/2002 |
| CN | 1434521 | 8/2003 |
| CN | 1444775 | 9/2003 |
| CN | 1558284 | 12/2004 |
| JP | 61-144890 | 2/1986 |
| JP | 04-028269 | 1/1992 |
| JP | 07-231120 | 8/1995 |
| JP | 11-031761 | 2/1999 |
| JP | 11-53920 A | 2/1999 |
| JP | 2000-315823 | 11/2000 |
| JP | 2003-318449 | 7/2003 |
| JP | 2003-224306 | 8/2003 |
| JP | 2004-087812 | 3/2004 |

(Continued)

OTHER PUBLICATIONS

Korean Office Action dated Apr. 25, 2007 with translation.

(Continued)

*Primary Examiner* — Toan Ton
*Assistant Examiner* — Britt D Hanley
(74) *Attorney, Agent, or Firm* — Buchanan Ingersoll & Rooney PC

(57) ABSTRACT

A backlight unit for a liquid crystal display (LCD) using a light emitting diode (LED) is provided. The backlight unit includes a blue light source, a red light source, and a green light source. The green light source includes an ultraviolet (UV) LED and a green phosphor excited by light emitted from the UV LED.

15 Claims, 4 Drawing Sheets

FOREIGN PATENT DOCUMENTS

JP    2004-179343    6/2004

OTHER PUBLICATIONS

Text of the First Office Action in CN 200610077122.6 dated Sep. 5, 2008, and a English Translation thereof.

Notice of Office Action dated Aug. 30, 2011, issued in the corresponding Japanese Patent Application No. 2006-121196, and an English Translation thereof.

Decision of Rejection issued on Jan. No. 17, 2012 in corresponding Japanese Patent Application No. 2006-121196, with translation.

* cited by examiner

BACKLIGHT UNIT FOR LCD USING LED

CROSS-REFERENCE TO RELATED PATENT APPLICATION

This application claims the benefits of Korean Patent Application No. 10-2005-0034919, filed on Apr. 27, 2005, and Korean Patent Application No. 10-2006-0026476, filed on Mar. 23, 2006, in the Korean Intellectual Property Office, the disclosures of which are incorporated herein in its entirety by reference.

BACKGROUND OF THE DISCLOSURE

1. Field of the Disclosure

The present disclosure relates to a backlight unit for a liquid crystal display (LCD) using a light emitting diode (LED), and more particularly, to a backlight unit for an LCD that employs a green light source with improved luminous efficiency.

2. Description of the Related Art

An LCD is a flat panel display (FPD) that is lightweight and consumes a small amount of power. However, the LCD is not a self-luminescent display but a light reception display for receiving light to form an image so that a user cannot distinguish the image in when in darkness. To solve this problem, a backlight unit is installed on a rear surface of the LCD.

A cold cathode fluorescent lamp (CCFL), which is a conventional backlight unit, has a fixed characteristic peak wavelength by gas discharge and exhibits low color purity owing to the noise wavelength of the LED.

To overcome the drawbacks of the CCFL, a backlight unit for an LCD using an LED is being investigated because the LED backlight unit makes emission wavelength and full width at half-maximum (FWHM) controllable and has not only very high color purity but also a good capacity for expressing color.

FIG. 1 is a graph showing internal quantum efficiency and extraction efficiency relative to peak wavelength.

Referring to FIG. 1, only a slight variation of extraction efficiency is shown in the entire wavelength range, but a very low internal quantum efficiency of 10% is shown in a green wavelength range of 500 to 600 nm. Therefore, a backlight unit for an LCD using a three-color LED needs green light sources in a number more than (e.g., twice as many as) the numbers of red light sources and blue light sources. This leads to a rise in power consumption and an increase in the cost of fabrication.

Meanwhile, light is emitted from a bandgap of an LED, and the bandgap is a function of temperature and current. Thus, a peak of emission wavelength may depend on the temperature and current of the LED. As a result, the LED emits unstable color of light according to variations in the temperature and current of the LED.

SUMMARY OF THE DISCLOSURE

The present invention may provide a backlight unit for a liquid crystal display (LCD) in which a green light emitting diode (LED) improves in luminous efficiency.

Also, the present invention may provide a backlight unit for an LCD, which includes an LED that emits visible rays with stable color coordinates.

According to an aspect of the present invention, there is provided a backlight unit for an LCD using an LED. The backlight unit includes a blue light source, a red light source, and a green light source. The green light source includes an ultraviolet (UV) LED and a green phosphor excited by light emitted from the UV LED.

The blue light source, the red light source, and the green light source may be used substantially in the same ratio, and the currents supplied to the blue light source, the red light source, and the green light source may be substantially the same as each other.

The green phosphor may be formed by adding an activator to one material selected from the group consisting of ZnS, $(BaSr)_2SiO_4$, $LaPO_4$, and $BaMgAl_{10}O_{17}$.

The green light source may be located on a packaging frame, and a silicon sub-mount may be further disposed between the green light source and the packaging frame.

A convex silicon resin surrounding the first UV LED may be formed between the first UV LED and the green phosphor, and the green phosphor may be formed on the silicon resin.

The green phosphor may be mixed with a silicon resin to roundedly surround the first UV LED.

The blue light source may include a second UV LED and a blue phosphor excited by light emitted from the second UV LED.

The red light source may include a third UV LED and a red phosphor excited by light emitted from the third UV LED.

BRIEF DESCRIPTION OF THE DRAWINGS

The above and other features and advantages of the present invention will be described in detailed exemplary embodiments thereof with reference to the attached drawings in which.

DETAILED DESCRIPTION OF EXEMPLARY EMBODIMENTS

Figure 1:
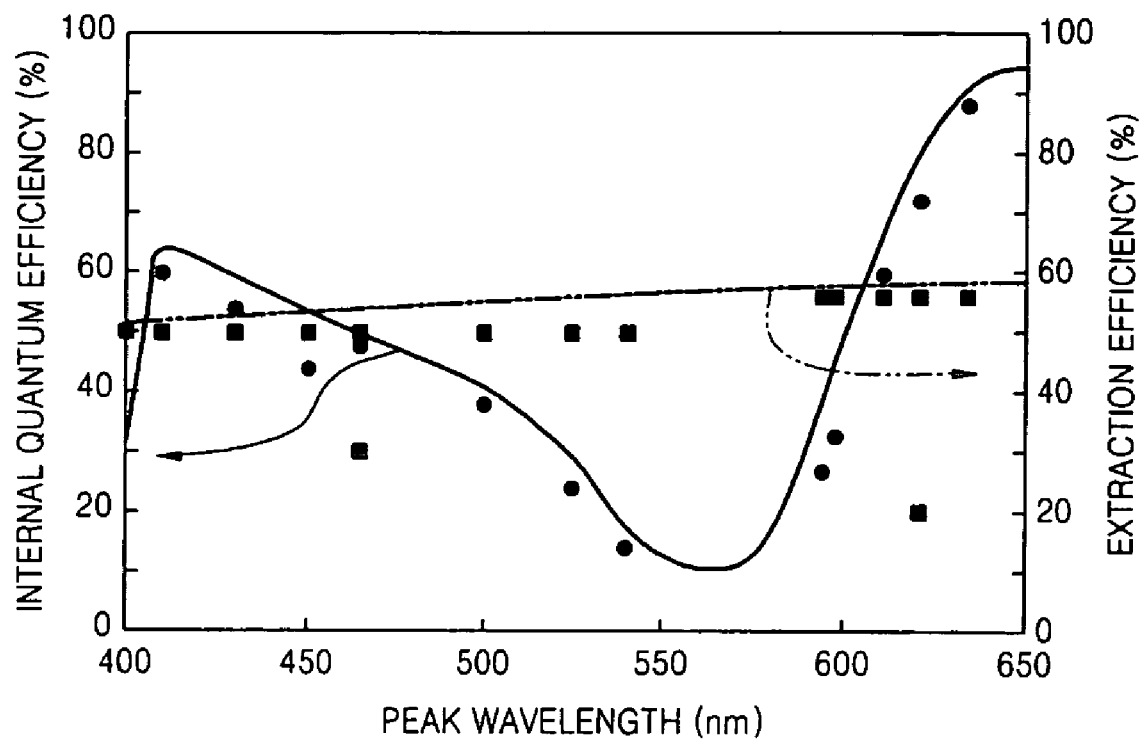
FIG. 1 is a graph showing internal quantum efficiency and extraction efficiency relative to the peak wavelength of the LED.

The present invention will now be described more fully hereinafter with reference to the accompanying drawings, in which exemplary embodiments of the invention are shown. This invention may, however, be embodied in different forms and should not be construed as limited to the embodiments set forth herein. Rather, these embodiments are provided for exemplary purposes. The same reference numerals are used to denote the same elements in the drawings. In the drawings, the thicknesses of layers and regions are exaggerated for clarity.

Figure 2:
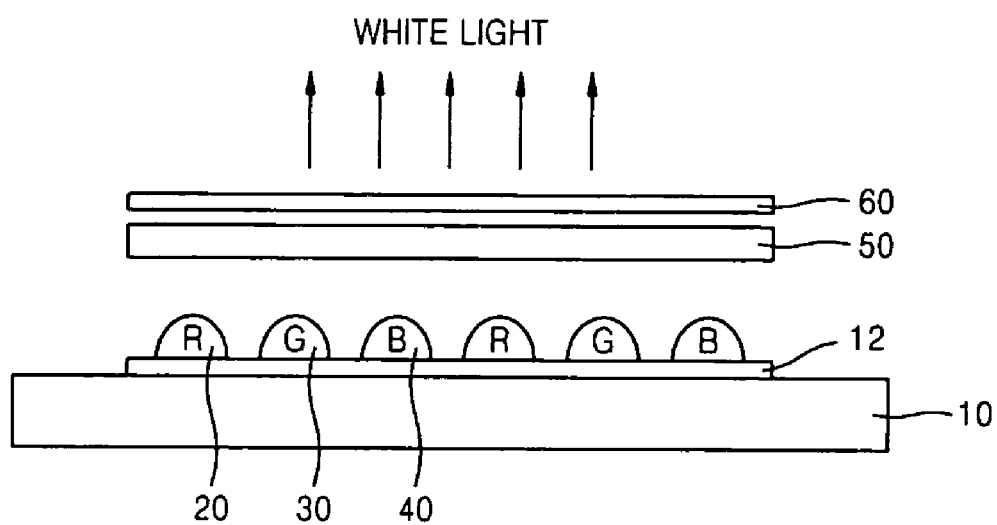
FIG. 2 is a diagram of a backlight unit for an LCD according to an exemplary embodiment of the present invention.

FIG. 2 is a diagram of a backlight unit for a liquid crystal display (LCD) according to an exemplary embodiment of the present invention.

Referring to FIG. 2, a printed circuit board (PCB) 12 is disposed on a substrate 10, and a plurality of red (R) light sources 20, a plurality of green (G) light sources 30, and a plurality of blue (B) light sources 40 are disposed on the PCB 12. The R, G, and B light sources 20, 30, and 40 are disposed in a ratio of about 1:1:1. Unlike a conventional backlight unit including G light sources in a number twice to three times as many as the numbers of R and B light sources, the structure of the backlight unit according to the present invention leads to a reduction in the cost of fabrication and a reduction in power consumption. Three-color light emitted from the R, G, and B light sources 20, 30, and 40 are uniformly mixed in a light guide plate 50, converted into white light, and incident on an LCD panel (not shown) through a diffusion plate 60. The arrangement of the R, G, and B light sources 20, 30, and 40, the light guide panel 50, and the diffusion plate 60 may be variously changed, and a more detailed description thereof is not included.

Figure 3:
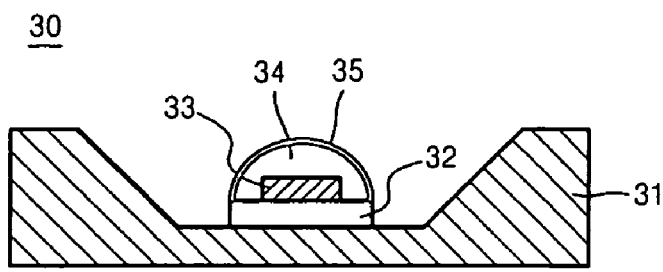
FIG. 3 is a cross-sectional view of a structure of a green (G) light source shown in FIG. 2.

FIG. 3 is a cross-sectional view of a structure of the G light source 30.

Referring to FIG. 3, the G light source 30 includes a silicon sub-mount 32 disposed on a bottom of a packaging frame 31, an ultraviolet (UV) light emitting diode (LED) 33, a silicon resin 34 surrounding the UV LED 33 on the sub-mount 32, and a G phosphor 35, which is applied on the silicon resin 34. The UV LED 33 may include an InGaAlN active layer (not shown) and emit the light having a peak wavelength of 430 nm or less (e.g., within a range of approximately 200~430 nm). The silicon sub-mount 32 emits the heat of the UV LED 33 to outside easily. The silicon resin 34 is roundedly formed on the UV LED 33 by a surface tension to form the convex G phosphor 35. The convex G phosphor 35 causes an even light emission.

The G phosphor 35 is a fluorescent material that is excited by UV light emitted from the UV LED 33 and emits light ranging from approximately 500 to 550 nm. The fluorescent material may be ZnS:Cu, Al, $(BaSr)_2SiO_4$:EuM(M: Ho, Er, Ce, or Y), $LaPO_4$:Eu, or $BaMgAl_{10}O_{17}$:Eu. The G phosphor 35 shows an optical conversion efficiency of approximately 45 to 50%. Thus, a luminous efficiency of approximately 30% is obtained by multiplying the 45 to 50% optical conversion efficiency of the G phosphor 35 and the 65% internal quantum efficiency of the UV LED 33 shown in FIG. 1. As a result, the G light source 30 including the UV LED 33 and the G phosphor 35 has almost the same luminous efficiency as two or three conventional G LEDs.

Figure 4:
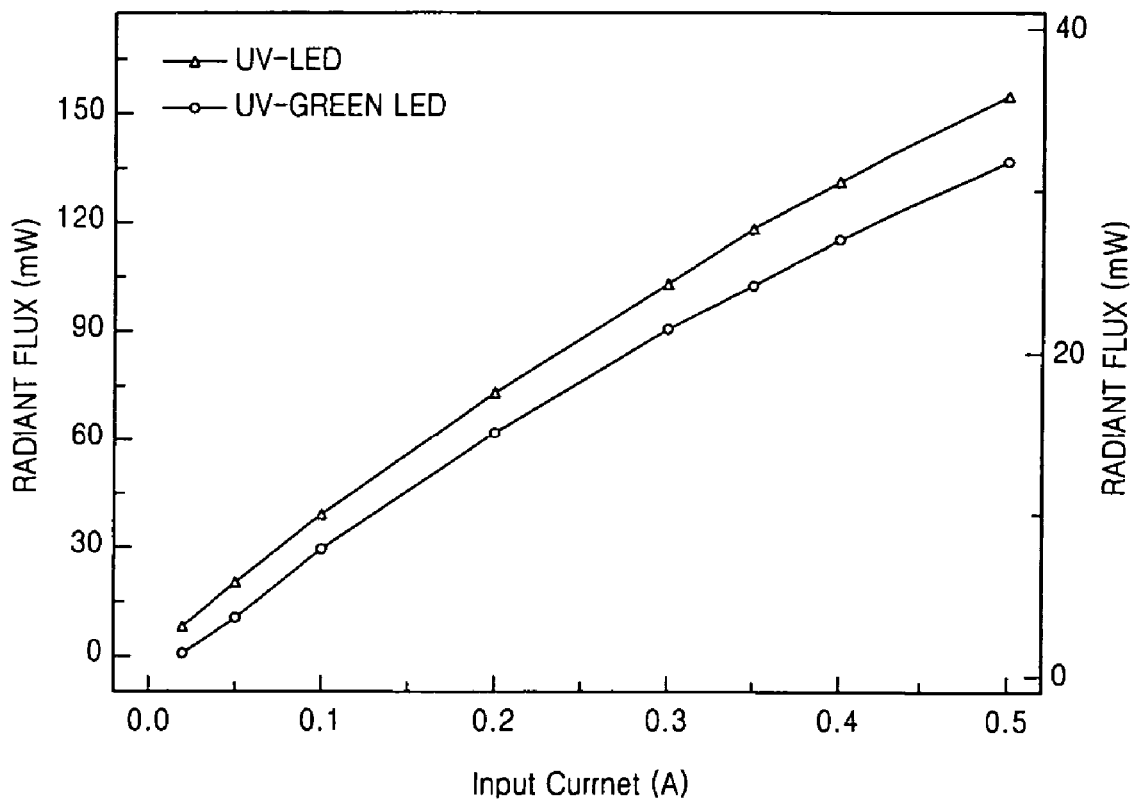
FIG. 4 is a graph showing an amount of light received according to current supplied to the G light source of FIG. 3.

FIG. 4 is a graph showing an amount of light received according to the current supplied to the G light source of FIG. 3.

As can be seen from FIG. 4, as current supplied to the UV LED (33 of FIG. 3) increases to 500 mA, the amount of UV light of the UV LED 33 linearly increases and the amount of green light from the UV-Green LED (30 of FIG. 3) also linearly increases.

Figure 5A:
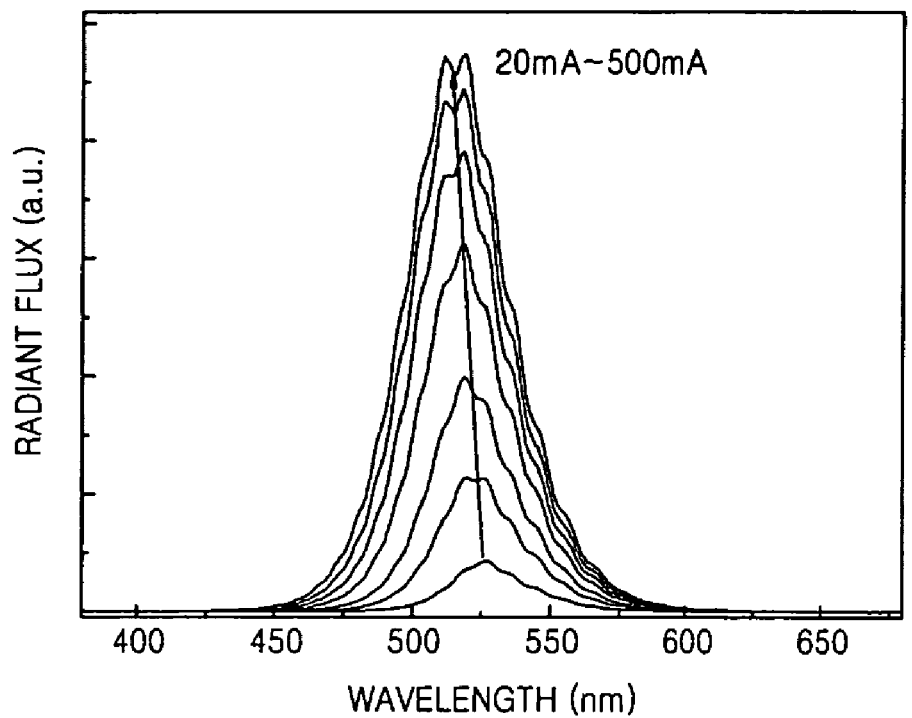
FIGS. 5A and 5B are graphs showing a variation in a peak wavelength over currents supplied to the G LED in a conventional manner and to the G light source of the present invention while increasing the currents from 20 mA to 500 mA.
Figure 5B:
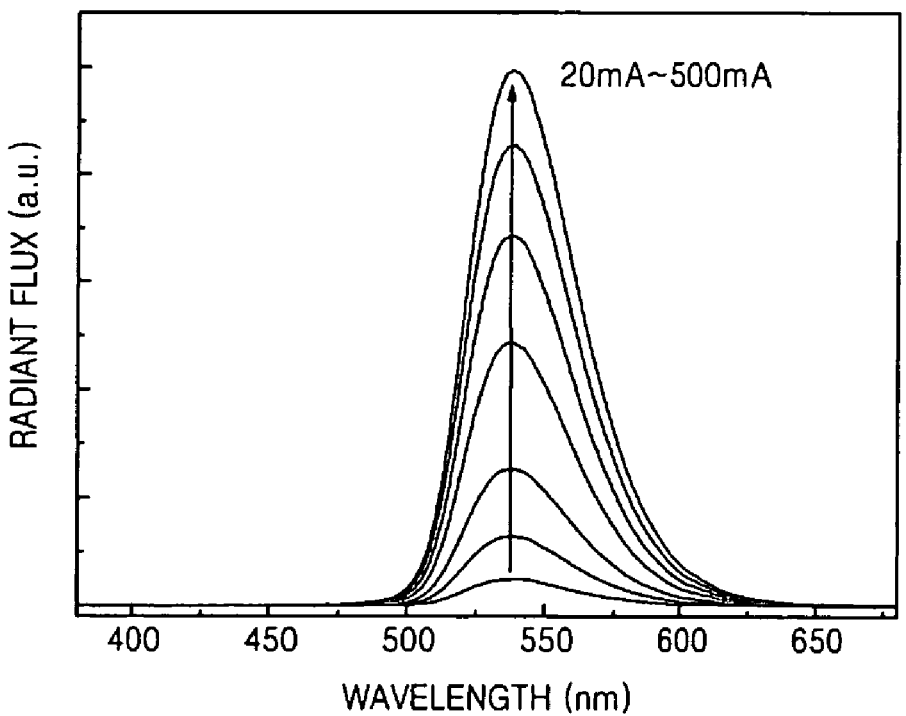

FIGS. 5A and 5B are graphs showing a variation in a peak wavelength over currents supplied to the G LED of the conventional technology and to the G light source of the present invention while increasing the currents from 20 mA to 500 mA. Referring to FIG. 5A, the peak wavelength of the conventional G LED is varied according to the increase of the supplied current; however, the peak wavelength of the G light source according to the present invention scarcely varies according to the increase of the supplied current (refer to FIG. 5B).

Figure 6:
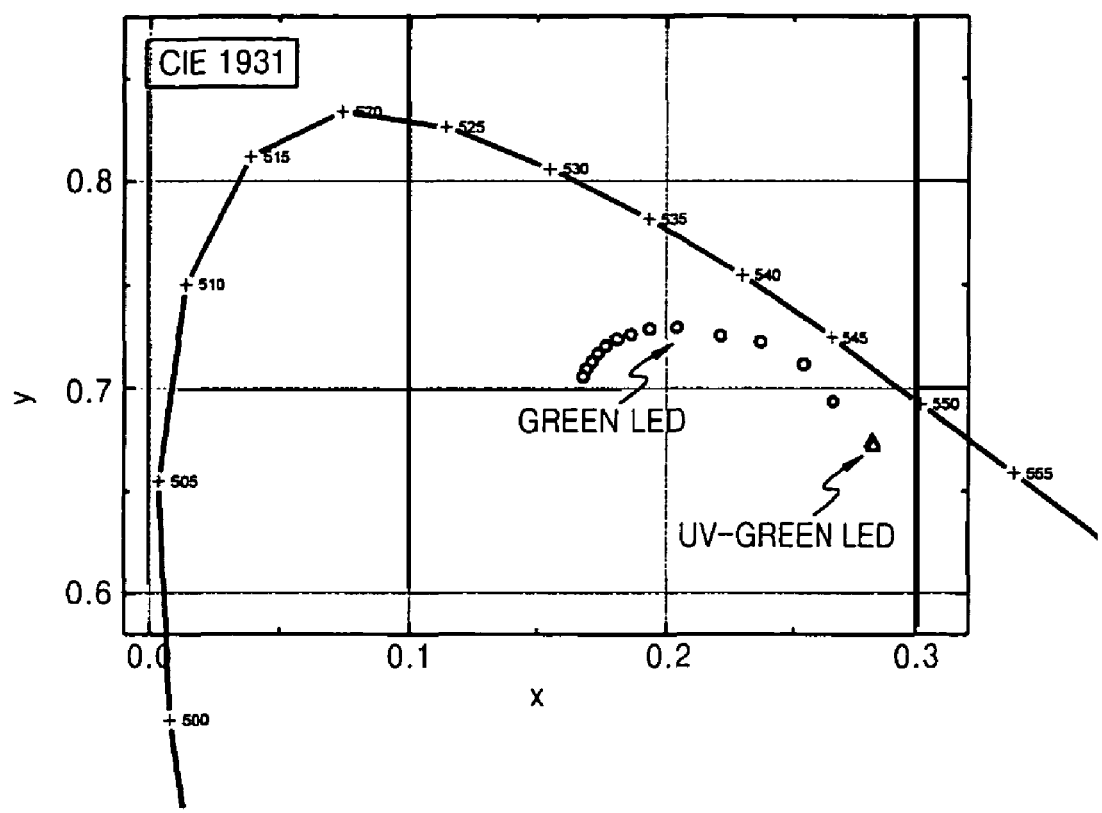
FIG. 6 is a graph showing a variation in G color coordinates over current supplied to the G LED in a conventional manner and the G light source while increasing the current from 20 mA to 500 mA.

FIG. 6 is a graph showing a variation in the color coordinates of G light as the current supplied to the G LED of the conventional technology and the G light source 30 increases from 20 mA to 500 mA. According to the conventional G LED, the peak wavelength is changed to a short wavelength when the current increases, and the color coordinates move to left side. The color coordinates of G light emitted from the G light source (UV-Green LED) of the present invention had stable values of X:0.282±0.0003 and Y:0.673±0.003 even when the supplied current was changed. Since the peak wavelength is scarcely changed according to the supplied current to the G light source, the stable color coordinate can be obtained. Therefore, the G light source of the present invention can be effectively used as a backlight of the display.

Figure 7:
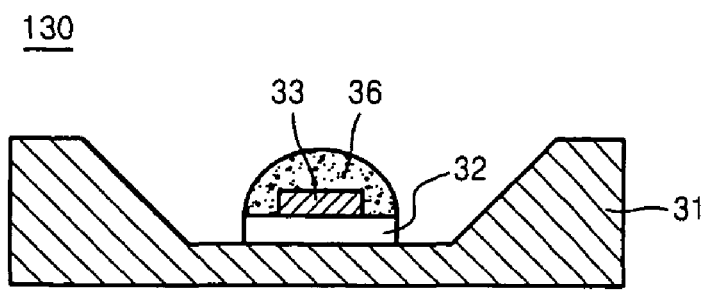
FIG. 7 is a cross-sectional view of a G light source according to another embodiment of the present invention.

FIG. 7 is a schematic cross-sectional view of a G light source according to another embodiment of the present invention. The same reference numerals denote the same elements as those of the G light source in FIG. 3, and a more detailed description is being omitted.

The G light source 130 includes a silicon sub-mount 32 disposed on a bottom of the packaging frame 31, a UV LED 33, and a G phosphor 36 mixed with a silicon resin and surrounding the UV LED 33 on the sub-mount 32. The UV LED 33 includes a InGaAlN active layer (not shown), and emits the light having 200~430 nm peak wavelength.

Like the G light source 30, the blue light source (40 of FIG. 2) may be formed on a UV LED by using a B phosphor that emits blue light ranging from 420 to 480 nm. The blue phosphor may be $Ca_{10}(PO_4)_6C_{12}$:Eu or $Sr_5(PO_4)_3Cl$:Eu.

Also, the red light source 20 may be formed on a UV LED by using a red phosphor that emits red light ranging from 600 to 700 nm. The red phosphor may be SrS:Eu, $Y_2O_2S$:Eu, YVO:Eu, or M(WO):Eu, Sm(M; Li, Na, K, Ba, Ca, or Mg). A backlight unit for an LCD using an LED according to the present invention can improve in luminous efficiency because the backlight unit employs a UV LED to emit G light. Therefore, the number of G light sources used for the backlight unit for the LCD can be reduced, and the power consumption of the backlight unit can be reduced.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A backlight unit using LED (light emitting diode), the backlight unit comprising a blue light source, a red light source, and a green light source,
   wherein the green light source comprises a first UV (ultraviolet) LED, the blue light source comprises a second UV LED, and the red light source comprises a third UV LED,
   wherein at least one of the green, blue and red light source comprises:
   a packaging frame having a cup-shaped recess recessed downwardly from a surface of the packaging frame;
   a silicone sub-mount disposed on a bottom of the recess of the package frame;
   at least one of the a first, second and third UV LEDs is mounted on the silicone sub-mount;
   a silicone resin is formed on an upper surface of the silicone sub-mount by surface tension to bulgingly surround all surfaces exposed by the silicone sub-mount of the at least one of the first, second and third UV LEDs on the upper surface of the silicone sub-mount, wherein the silicone resin is not directly disposed on the packaging frame; and at least one of a green, blue and red phosphor which is excited by light emitted from at least one of the first, second and third UV LEDs, wherein an upper surface of the silicone sub-mount defines a silicone resin forming region.

2. The backlight unit of claim 1, wherein the blue light source, the red light source, and the green light source are used in the same ratio, and current supplied to the blue light source, the red light source, and the green light source are the same as each other.

3. The backlight unit of claim 1, wherein the green phosphor is formed by adding an activator to one material selected from the group consisting of ZnS, $(BaSr)_2SiO_4$, $LaPO_4$, and $BaMgAl_{10}O_{17}$.

4. The backlight unit of claim 1, wherein a peak wavelength of the first UV LED is 430 nm or less.

5. The backlight unit of claim 4, wherein the first UV LED includes an InGaAlN active layer.

6. The backlight unit of claim 1, wherein the silicone resin surrounding the first UV LED is formed between the first UV LED and the green phosphor, and the green phosphor is formed on the silicone resin.

7. The backlight unit of claim 1, wherein the green phosphor is mixed with the silicone resin to bulgingly surround the first UV LED on the silicone sub-mount.

8. The backlight unit of claim 1, wherein the blue light source comprises:

a packaging frame having a cup-shaped recess recessed downwardly from a surface of the packaging frame;

a silicone sub-mount disposed on a bottom of the recess of the package frame;

the second UV LED mounted on the silicone sub-mount;

a silicone resin formed on an upper surface of the silicone sub-mount by surface tension, to bulgingly surround the second UV LED on the upper surface of the silicone sub-mount; and a blue phosphor excited by light emitted from the second UV LED.

9. The backlight unit of claim 8, wherein the blue phosphor is formed by adding an activator to $Ca_2(PO_4)_6C_{12}$ and/or $Sr_5(PO_4)_3Cl$.

10. The backlight unit of claim 8, wherein the silicone resin surrounding the second UV LED is formed between the second UV LED and the blue phosphor, and the blue phosphor is formed on the silicone resin.

11. The backlight unit of claim 8, wherein the blue phosphor is mixed with the silicone resin to bulgingly surround the second UV LED on the silicone sub-mount.

12. The backlight unit of claim 1, wherein the red light source comprises:

a packaging frame having a cup-shaped recess recessed downwardly from a surface of the packaging frame;

a silicone sub-mount disposed on a bottom of the recess of the package frame;

the third UV LED mounted on the silicone sub-mount;

a silicone resin formed on an upper surface of the silicone sub-mount by surface tension, to bulgingly surround the third UV LED on the upper surface of the silicone sub-mount; and a red phosphor excited by light emitted from the third UV LED.

13. The backlight unit of claim 12, wherein the red phosphor is formed by adding an activator to one material selected from the group consisting of SrS, $Y_2O_2S$, YVO, M(WO), and M is a material selected from the group consisting of Li, Na, K, Ba, Ca, and Mg.

14. The backlight unit of claim 12, wherein the silicone resin surrounding the third UV LED is formed between the third UV LED and the red phosphor, and the red phosphor is formed on the silicone resin.

15. The backlight unit of claim 12, wherein the red phosphor is mixed with the silicone resin to bulgingly surround the third UV LED on the silicone sub-mount.

* * * * *